(12) United States Patent
Van Esch et al.

(10) Patent No.: US 6,196,379 B1
(45) Date of Patent: Mar. 6, 2001

(54) MODULE HAVING A RETAINING MEMBER FOR USE IN A MODULAR CONVEYOR MAT

(75) Inventors: Franciscus Josephus Maria Van Esch, Breda; George Johannes Van Zijderveld, s-Gravenzande, both of (NL)

(73) Assignee: MCC Nederland B.V. (NL)

( * ) Notice: Subject to any disclaimer, the term of this patent is extended or adjusted under 35 U.S.C. 154(b) by 0 days.

(21) Appl. No.: 09/251,270

(22) Filed: Feb. 16, 1999

(30) Foreign Application Priority Data

Feb. 18, 1998 (NL) ................................... 1008343

(51) Int. Cl.[7] .................................. B65G 17/06
(52) U.S. Cl. .......................... 198/853; 198/848
(58) Field of Search ..................... 198/853, 848

(56) References Cited

U.S. PATENT DOCUMENTS

| 5,217,110 | 6/1993 | Spangler et al. |
| 5,335,768 | 8/1994 | Schladweiler. |
| 5,482,156 * | 1/1996 | Damkjaer ............................. 198/853 |
| 5,899,322 * | 5/1999 | Gamble, Jr. ......................... 198/853 |

FOREIGN PATENT DOCUMENTS

| PCT/US97/ 09707 | 2/1998 | (WO). |

* cited by examiner

Primary Examiner—Christopher P. Ellis
Assistant Examiner—Mark A. Deuble
(74) Attorney, Agent, or Firm—Varnum, Riddering, Schmidt & Howlett LLP

(57) ABSTRACT

A module for a modular conveyor mat is provided with front hinge loops and rear hinge loops and the front hinge loops of one module are adapted to be joined to rear hinge loops of an adjacent module by a hinge pin extending transversely to the conveying direction, a recess in the module accommodates a retaining member having a closing part rotatable between a first position for retaining the hinge pin and a second position for releasing the hinge pin.

16 Claims, 8 Drawing Sheets

IX - IX

MODULE HAVING A RETAINING MEMBER FOR USE IN A MODULAR CONVEYOR MAT

BACKGROUND OF THE INVENTION

1. Field of the Invention

The invention relates to a module for a modular conveyor mat, comprising a front side and a rear side having hinge loops extending outwards relative to the module, such that in two modules succeeding each other in a conveying direction, the hinge loops on the front side of one module can cooperate with the hinge loops on the rear side of the other module and can be coupled by means of hinge pins extending transversely to the conveying direction, said module further comprising a top side, a bottom side and two lateral sides located opposite each other transversely to the conveying direction, and at least one recess accommodating a retaining member which is rotatable relative to a rotation axis extending through the retaining member, such that a closing part of the retaining member is rotatable between a first position in which the closing part can retain a hinge pin received by the hinge loops transversely to the conveying direction and a second position in which the closing part can release a hinge pin received by the hinge loops transversely to the conveying direction.

2. Description of Related Art

Such a module is used for composing a modular conveyor mat. A conventional modular conveyor mat is built up of a number of modules succeeding each other in a conveying direction and arranged side-by-side transversely to the conveying direction. Viewed in conveying direction, the modules each have their front and rear sides provided with hinge loops. The hinge loops of modules succeeding each other in conveying direction cooperate and are coupled by means of hinge pins extending transversely to the conveying direction. For retaining the hinge pins transversely to the conveying direction, the modules that are located adjacent the lateral sides of the conveyor mat are provided with a retaining member. A module having a retaining member is also referred to as 'end module', while the retaining member in assembled condition is also referred to as 'retaining mechanism'.

During assembly of the conveyor mat, after two rows of modules succeeding each other in conveying direction have been coupled by means of a hinge pin, the hinge pin is retained transversely to the conveying direction between the retaining members of two end modules arranged on opposite ends of the row of modules. Disassembly of the mat proceeds in reverse order.

It is observed that an end module may comprise several retaining members, for instance when a conveyor mat comprises only one module, viewed transversely to the conveying direction.

In practice, a large number of requirements are imposed on the retaining member of an end module. The operation of the retaining member must be simple, i.e. it must be possible to carry out the operation without any special directions and/or special tools. Further, the retaining member must be insusceptible to dirt. Moreover, it must be possible to check in a simple manner whether the retaining member is in a position in which it retains a hinge pin received by the hinge loops. A further requirement imposed on the retaining member is that it does not have to be removed for enabling fitting the hinge pin, so as to reduce the risk of the retaining member getting lost. Further, the retaining member must be insusceptible to wear of the top, bottom and lateral side of the end module. Another important requirement imposed on a retaining member is that the retaining member must not impede the assembly/disassembly of the conveyor mat.

In practice, it has proved to be difficult to provide an end module that satisfies the above requirements. U.S. Pat. No. 5,335,768 discloses a module whose retaining member comprises an arm rotatable between a first position in which it can retain a hinge pin received by the hinge loops transversely to the conveying direction in that it closes the hinge hole, and a second position in which the arm can release a hinge pin received by the hinge loops transversely to the conveying direction in that the arm extends outwards relative to the bottom side of the module. As the arm extends outwards, there is the chance of the arm getting damaged, for instance when a retaining member of an end module of a moving conveyor mat accidentally adopts the second position and bumps against an obstacle. This leads to a highly reduced reliability in operation of the conveyor mat. Further, the disassembly of a row of modules of a conveyor mat already arranged on a conveyor track is rendered difficult, because the conveyor mat at the location of the end module must first be lifted from the conveyor track to enable operating the retaining member and/or the conveyor track must be provided with a space in which the arm in the second position can be accommodated. Disassembly is problematic in particular when the conveyor mat is taut. Moreover, the bottom side of the module is provided with a relatively large opening adjacent the arm, which increases the chance of the retaining member being blocked by the entrance of dirt. Further, the wall parts located adjacent the opening are relatively thin. Consequently, the chance of a wall part breaking off when catching behind something is fairly substantial, which reduces the reliability in operation of the retaining member.

SUMMARY OF THE INVENTION

The object of the invention is to provide a module of the type mentioned in the preamble, which meets the above requirements and does not have the above drawbacks. To that end, the module according to the invention is characterized in that both in said first and second position of the closing part and in intermediate positions of the closing part, the retaining member is located within boundary faces formed by the top side and the bottom side of the module. It is thus provided that the retaining member is protected more adequately against damage and/or fouling, which increases the reliability in operation. It further provides that during disassembly of a row of modules from a conveyor mat already arranged on a conveyor track, the retaining member can be operated without the end module having to be lifted from the conveyor track or without space for accommodating the retaining member having to be created otherwise.

In another embodiment, the module according to the invention is characterized in that the rotation axis intersects a center line extending through the hinge loops of the front or rear side of the module, preferably at an angle of between 10° and 80°, more preferably between 15° and 75°. It is thus provided that an outer part of the retaining member in said first position can, by its edge, connect all around to the lateral side of the module so as to impede the entrance of dirt and, moreover, prevent the situation where the accumulation of dirt around the outer part prevents reaching said positions through rotation. Further, it i:B thus provided that the dimension of the closing part in radial direction relative to the rotation axis of the retaining member can be small and that hence the space required for rotating the closing part between the first position and the second position may also be small, which facilitates the receipt of the retaining member within the boundary faces of the module formed by the top and bottom sides of the module. It is further provided that it is possible to transmit the force exerted by the hinge pin to the module both in axial direction and in radial direction relative to the hinge pin.

Further elaborations of advantageous embodiments of the module according to the invention are described in the subclaims.

BRIEF DESCRIPTION OF THE DRAWINGS

The invention will hereinafter be specified on the basis of a number of examples of embodiments shown in the accompanying drawings. In these drawings.

DETAILED DESCRIPTION

Figure 1:
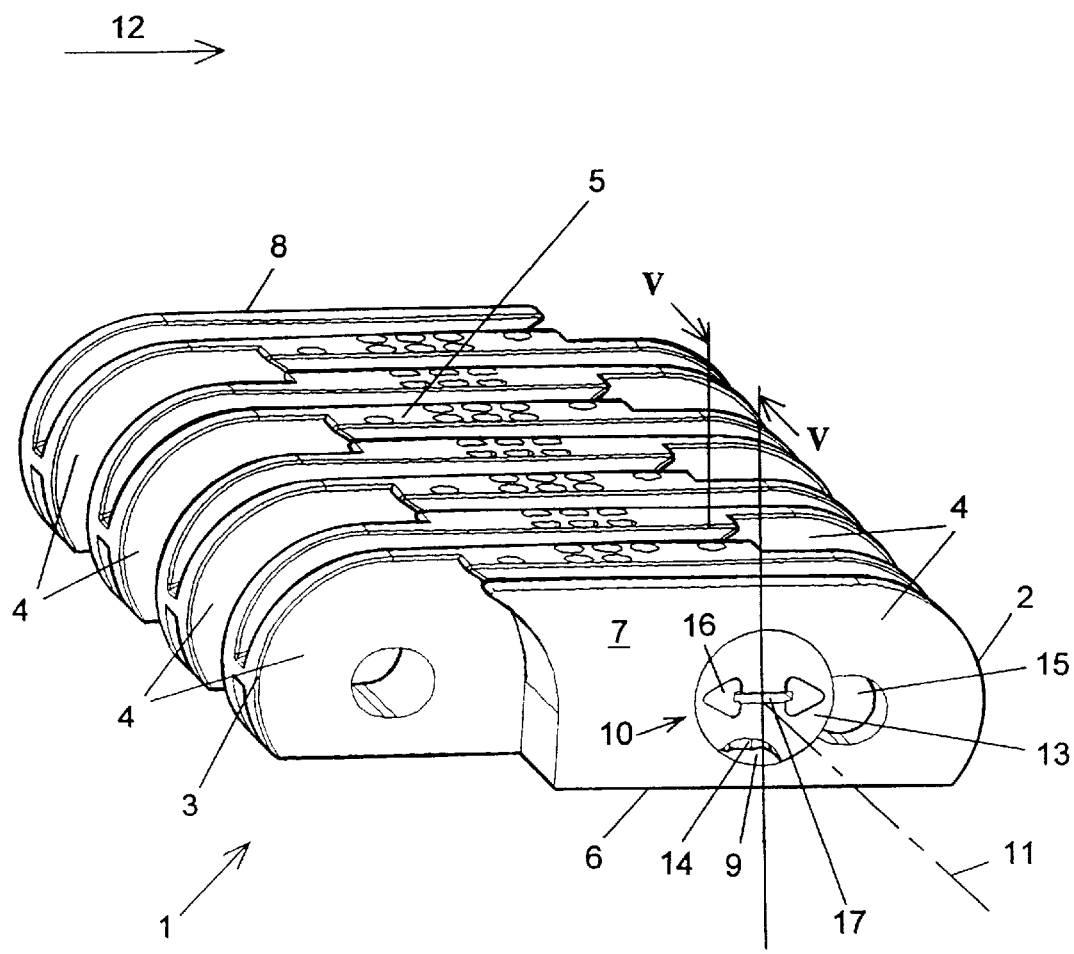
FIG. 1 is a schematic, perspective view of an exemplary embodiment of the module according to the invention with the closing part in its first position.

It is observed that the Figures are only schematic representations of preferred embodiments and that within the framework of the claims, a great many other embodiments are possible. In the Figures, identical or similar parts have been designated by corresponding reference numerals.

Referring to FIG. 1, a module 1 is shown having a front side 2 and a rear side 3, viewed in a conveying direction 12 indicated by an arrow. The module 1 has its front side 2 and rear side 3 provided with hinge loops 4 extending outwards relative to the module 1. The hinge loops 4 of two modules succeeding each other in conveying direction 12 cooperate in such a manner that the hinge loops 4 on the rear side 3 of a module 1 that leads in conveying direction 12 interlock with the hinge loops 4 on the front side 2 of the module 1 that follows in conveying direction. The cooperating hinge loops 4 can be coupled by means of hinge pins extending transversely to the conveying direction (not shown). The coupled modules may be of identical or different types. A module provided with a retaining member may, for instance, be coupled in conveying direction to a module without retaining member. The module 1 further comprises a top side 5, a bottom side 6 and two lateral sides 7 and 8, located opposite each other transversely to the conveying direction. Provided in the lateral side 7 is a recess 9 accommodating a retaining member 10 which is rotatable relative to a rotation axis 11 extending through the retaining member 10.

The retaining member 10 comprises a closing part which, in FIG. 1, is in a first position in which it can retain a hinge pin received by the hinge loops 4 transversely to the conveying direction 12. The closing part is designed as a cylindrical element 13 which extends coaxially to the rotation axis 11 and which also forms an outermost part of the retaining member 10, and which, in the first position of the closing part, is substantially flush with the lateral side 7 of the module 1 in which the retaining member 10 is accommodated. It is thus provided that the chance of damage to the retaining member and/or impediment to the operation of the retaining member due to fouling during use of the module, is slight.

Adjacent its circumferential edge, the cylindrical element 13 is provided with a nick 14 extending in the longitudinal direction of the rotation axis. In the first position shown in FIG. 1, a hinge pin received by the hinge loops 4 can be retained transversely to the conveying direction 12 in that the cylindrical element 13 covers a hinge hole 15 of one of the hinge loops 4 at least partially. The horizontal position of the arrow 16 provided on the outside of the cylindrical element 13 indicates that the closing part is in its first position.

Figure 2:
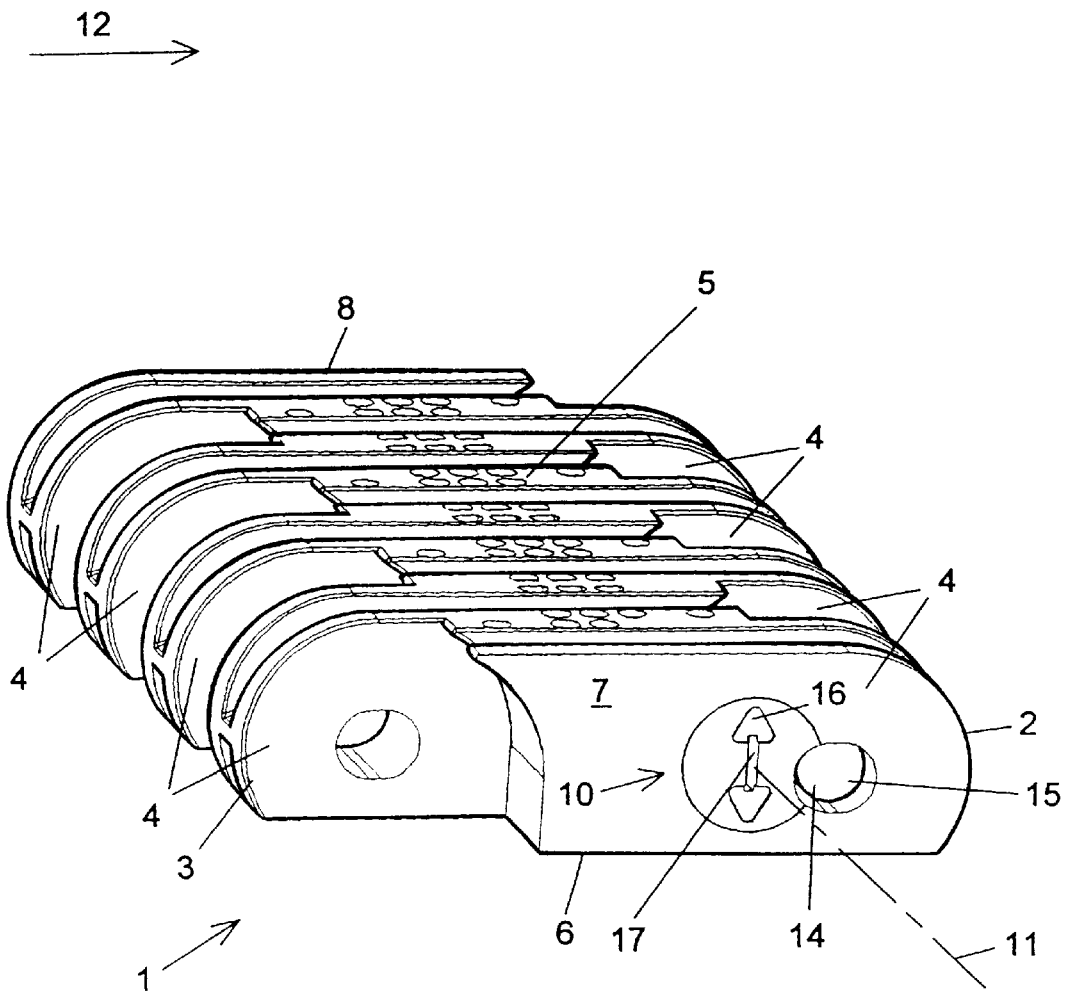
FIG. 2 is a schematic, perspective view of the module of FIG. 1 with the closing part in its second position.

At the center of the arrow 16, the cylindrical element 13 is provided with a groove 17 into which a screwdriver can be inserted. By means of the screwdriver, the retaining member 10 can be rotated anti-clockwise over 90° relative to the rotation axis 11, such that the nick 14 in the cylindrical element 13 corresponds with the hinge hole 15 (FIG. 2). As a result, the cylindrical element 13 is in a second position in which a hinge pin, received by the hinge loops 4, can be released transversely to the conveying direction 12. The vertical position of the arrow 16 then indicates that the cylindrical element 13 is in its second position.

It is observed that the closing part may also have a shape other than the cylindrical form of the element 13 shown in FIG. 1. It is further observed that embodiments in which the retaining member 10 can be rotated over a greater or smaller angle than 90° about the rotation axis 11 between the first and second position, are also possible. Moreover, the recess 9 may have a different shape and may also be arranged in another place in the module 1.

Figure 3:
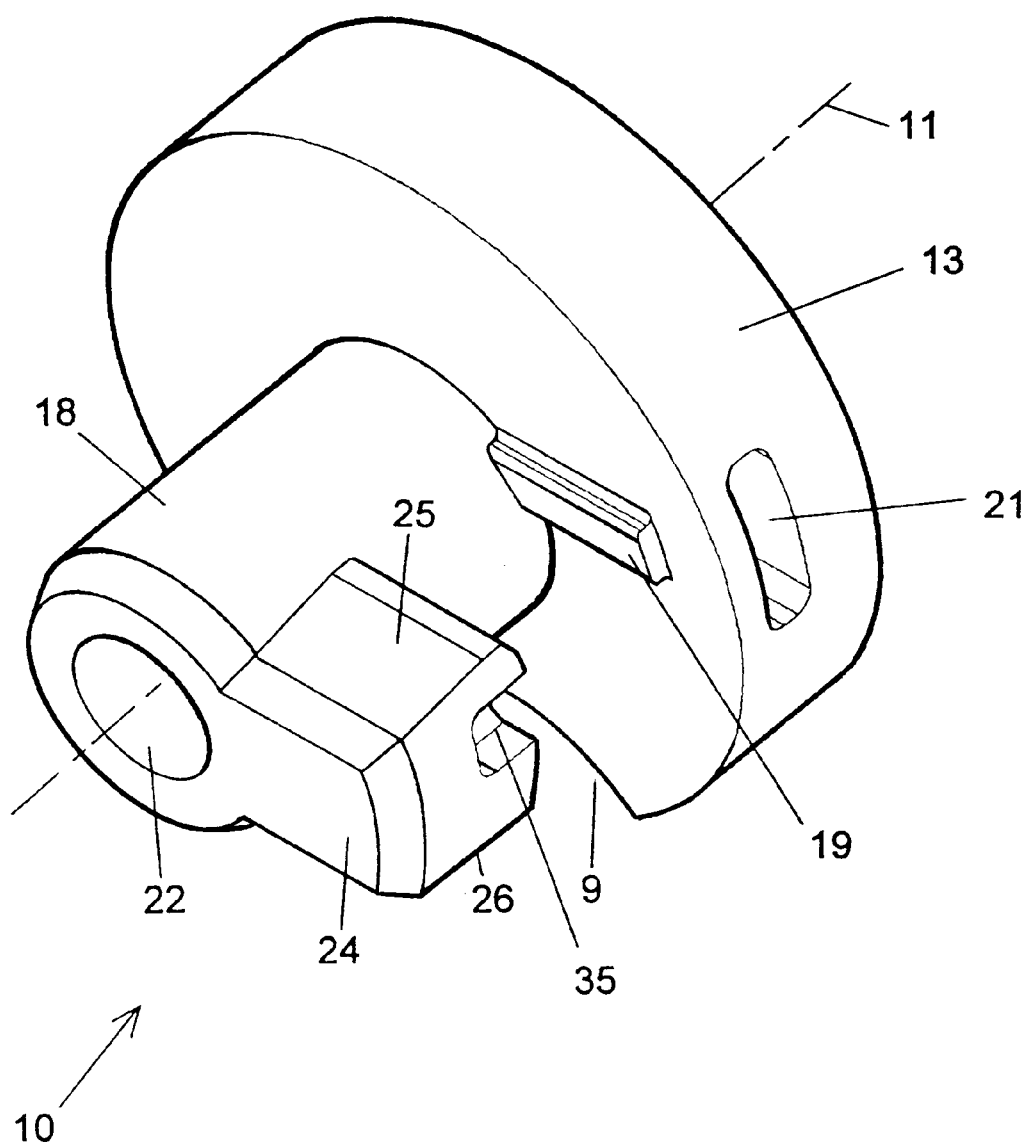
FIG. 3 is a schematic, perspective view of the retaining member of the module of FIG. 1.
Figure 4:
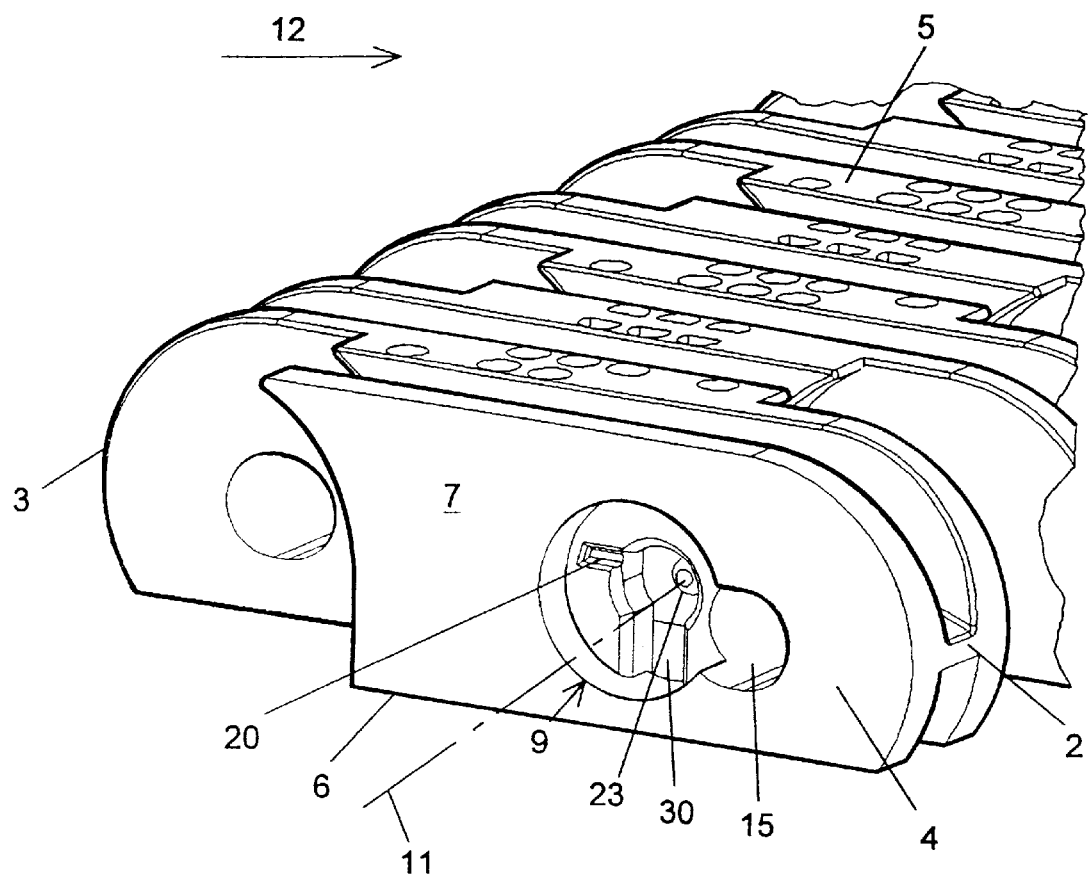
FIG. 4 is a schematic, perspective view of the module of FIG. 1 in which the retaining member has been removed.

Referring to FIG. 3, the retaining member 10 is shown in detail therein. The retaining member 10 comprises a cylindrical shank 18 carrying the cylindrical element 13 coaxially to the rotation axis 11. The cylindrical element 13 comprises a raised edge 19 cooperating with a corresponding groove 20 provided in the wall of the recess 9 in the module 1 (FIG. 4). It is thus provided that rotation of the cylindrical element 13 from the first position is rendered more difficult, which has a locking effect. Further, it is thus effected that when the first position is being reached, a click signal is given. Of course, in an analogous manner, the retaining member 10 may also be provided with a groove and the recess 9 may be provided with a raised edge. Provided in a cylindrical part 13 is a cavity 21 to realize a spring action of the raised edge 19, which further increases the locking effect.

Figure 5:
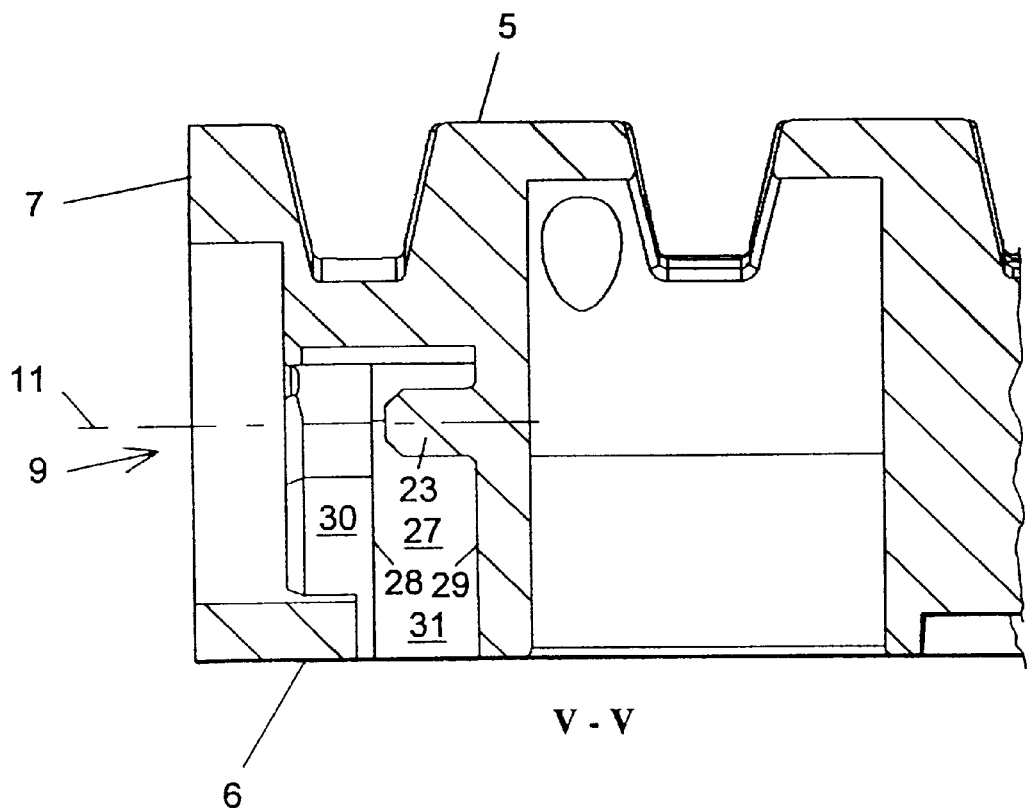
FIG. 5 is a schematic, perspective view of a part of the module of FIG. 1, taken along the line V—V.

The shank 18 of the retaining member 10 is provided with a bore 22 extending over at least a part of the rotation axis 11 and cooperating with a pin 23 which extends into that bore 22 from the wall of the recess 9 (FIG. 5). It is thus provided that the retaining member 10 is centered during rotation about the rotation axis 11. Moreover, misalignment of the retaining member 10 relative to the cavity 9 due to forces exerted on the cylindrical element 13 by a retained hinge pin, is reduced.

Referring again to FIG. 3, the retaining member 10 comprises a blocking member in the form of a projection 24 attached to the shank 18 and extending radially outwards relative to the rotation axis 11 of the retaining member 10. The projection 24 is provided with sidewalls 25, 26 extending in V-shaped configuration in longitudinal direction of the rotation axis 11 of the retaining member 10 and extending outwards relative to each other. Provided between the sidewalls 25, 26 is a groove 35 whereby the sidewalls 23, 26 are resiliently movable relative to each other. As blocking member, the projection 24 cooperates with guide means arranged in the edge of the recess 9, such that axial movement of the retaining member 10 along the rotation axis 11 is obstructed. Hence, the closing part and the blocking member are designed as separate parts of the retaining member.

Referring to FIG. 5, the guide means are designed as a guideway 27 extending over a circular arc relative to the rotation axis 11, of which guideway the sidewalls 28, 29 guide the projection 24 in such a manner that the guideway 27 impedes axial movement of the retaining member 10 along the rotation axis 11 and bounds rotation of the cylindrical element 13 between said first and second position. It is thus provided that said misalignment is further prevented. The module 1 is provided with an opening 30 which is located slightly inwards relative to the lateral side 7 and through which the guideway 27 for the projection 24 of the retaining member 10 is accessible. When the retaining member 10 is being inserted into the cavity 9 in the module 1, the projection 24 is pushed through the opening 30, and after the sidewalls 25, 26 of the projection 24 have passed the opening 30, they spring outwards to cause the projection to be retained in the guideway 27. It is thus provided that in the first and second position, as well as in intermediate positions, the retaining member 10 is connected to the module 1 and hence cannot become lost.

Figure 6:
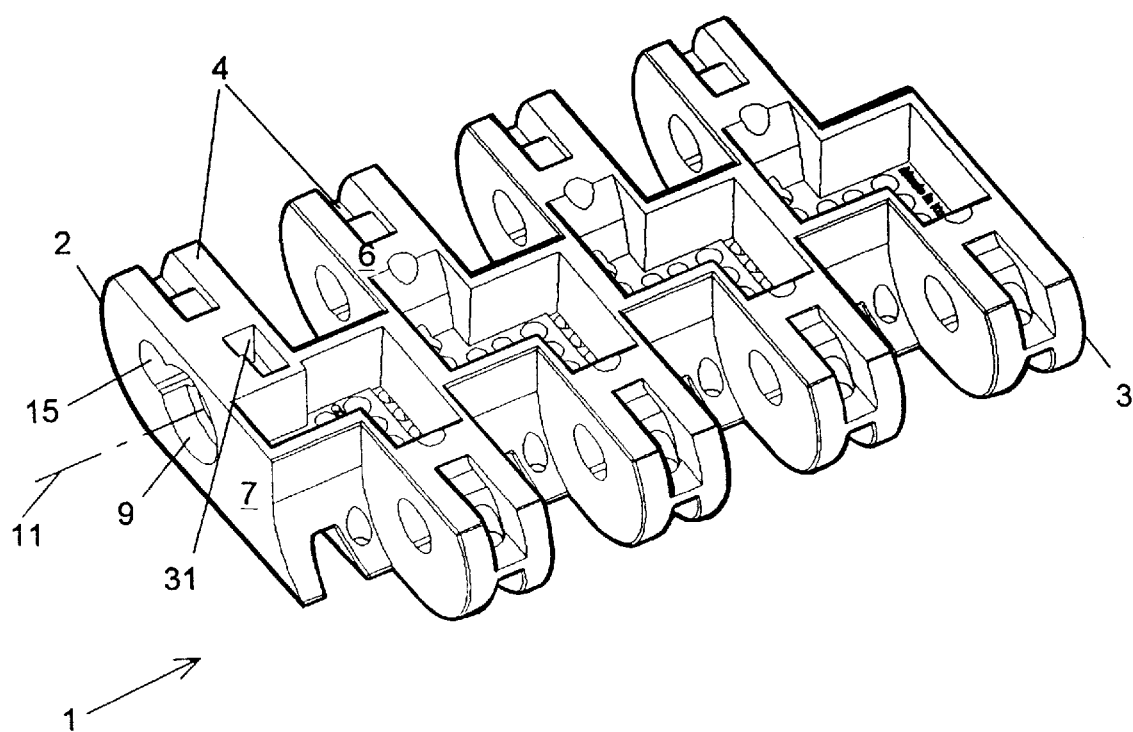
FIG. 6 is a schematic, perspective bottom view of the module of FIG. 4.

The module 1 further has its bottom side 6 provided with an opening 31 through which the projection 24, when located in the guideway, is accessible for being pressed from the guideway 29 (FIG. 6). It is thus provided that the retaining member 10 can be detached from the module 1 by performing a separate operation.

It is observed that like the opening 31, the blocking member and the guide means cooperating therewith can be designed in a great many different manners, for instance as an annular raised edge cooperating with a corresponding annular groove.

When a row of modules is being disassembled from a conveyor mat already arranged on a conveyor track, the retaining member 10 is rotated anti-clockwise by means of a screwdriver placed in groove 17, from the first position shown in FIG. 1 into the second position shown in FIG. 2. Subsequently, the hinge pin on the front side of the module can be removed. This can for instance be performed by pressing the hinge pin out of the hinge loops 4 with a second pin, after the closing part of a retaining member 10 of an opposite module 1 transversely to the conveying direction has likewise been brought into a second, open position. By repeating this operation for the row of modules 1 that follows in conveying direction 12, a hinge pin arranged through the hinge loops 4 on the rear side 3 of the module 1 can be removed as well, after which the row of modules can be removed. The assembly of the row of modules is effected in reverse order. It is observed that the process of fitting and moving from the first position into the second position and vice versa cannot only be performed manually, but can also be automated conveniently.

Hence, in this manner, there is provided a module 1 having a retaining member 10 which, in said first and second position of the closing part 13 as well as in intermediate positions of the closing part, is located within boundary faces constituted by the top side 5 and the bottom side 6 of the module 1.

Figure 7:
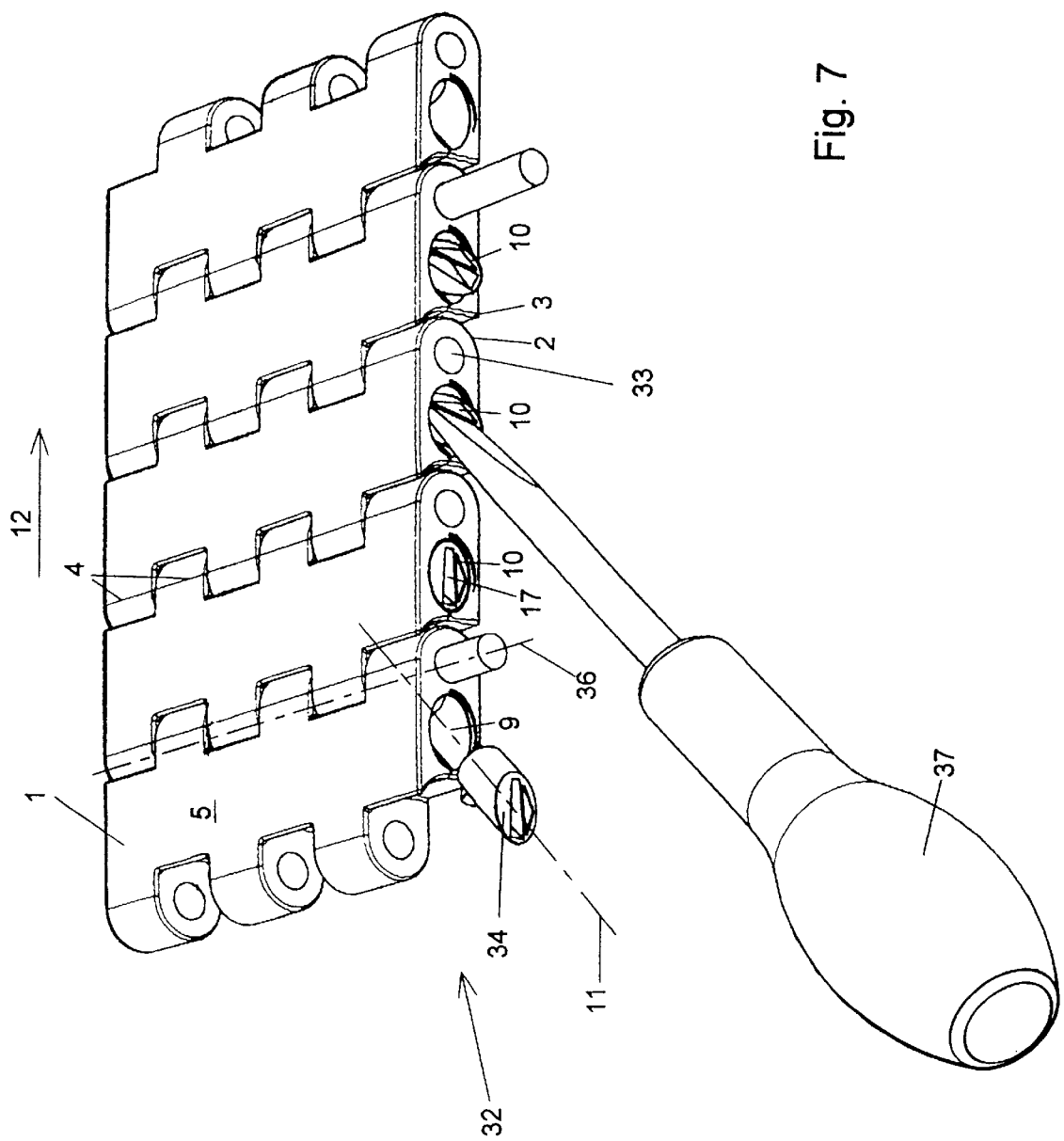
FIG. 7 is a schematic, perspective view of a part of a conveyor mat having modules according to another embodiment of the invention.

Referring to FIG. 7, a part of a conveyor mat 32 is shown therein with a number of modules 1, succeeding each other in a conveying direction 12, according to another embodiment of the invention. The hinge loops 4 on the front side 2 and the rear side 3 of modules 1 succeeding each other in conveying direction 12 cooperate and are coupled by means of hinge pins 33 extending through the hinge loops 4 transversely to the conveying direction 12. The modules 1 have their lateral side 7 provided with substantially cylindrical recesses 9 for receiving a substantially cylindrical retaining member 10. The diameter of the recess 9 corresponds with the diameter of the retaining member 10.

The retaining member 10 is coaxially and rotatably received in the recess 9, such that the rotation axis 11 of the retaining member 10 intersects the center line 36 extending through the hinge loops 4 of the front side 2 of the module 1 at an angle of 45°. It is thus provided that the dimension of the closing part in radial direction relative to the rotation axis of the retaining member may be small and that, hence, the space necessary for enabling rotation of the closing part between the first position and the second position may also be small, which facilitates receiving the retaining member within the boundary faces of the module formed by the top side and the bottom side of the module. Further, it is thus provided that it is possible to transmit the force exerted by the hinge pin to the module, in axial direction as well as in radial direction relative to the hinge pin. It is observed that depending on the desired geometry of the module, a greater or smaller angle of intersection can be opted for, and that the retaining member may also be arranged elsewhere in the module.

The end face 34 has a bevel of 45° relative to the rotation axis 11 and forms, when the retaining member 10 has been received in the recess 9 in the module, an outermost part of the retaining member 10. In this manner, there is obtained a retaining member 10 whose operation is highly insensitive to dirt. Not only is the outermost part of the retaining member in the first position flush with the wall 7 of the module 1, but also, as the edge of the outermost part of the retaining member connects to the lateral side 7 of the module 1 all around, dirt that is possibly located adjacent said edge cannot obstruct, through accumulation, the reaching of one of the positions during rotation. Hence, the bevel angle preferably corresponds to the angle of intersection between the rotation axis 11 and the center line 36.

Figure 8:
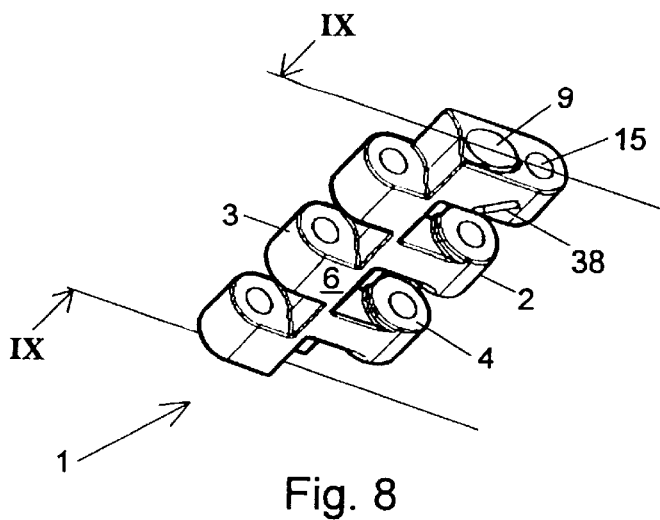
FIG. 8 is a schematic, perspective bottom view of a module of the conveyor mat of FIG. 7, in which the retaining member has been removed.
Figure 9:
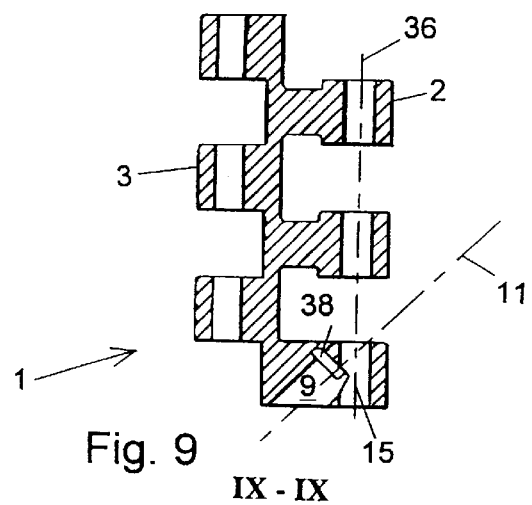
FIG. 9 shows a section of the module of FIG. 8, taken along the line IX—IX.

Referring to FIG. 8, a module 1 of the conveyor mat 32 of FIG. 7 is shown therein, of which the retaining member 10 has been removed. FIG. 9 shows, in cross section, how the recess 9 in the module of FIG. 9 connects to the cavity formed by the hinge hole 15. The recess 9 comprises a guide means which is designed as a groove 38 and which, in assembled condition of the retaining member, cooperates with a blocking member thereof designed as snap finger 39, so as to impede axial movement of the retaining member 10 along the rotation axis 11 and to limit rotation of the retaining member about the rotation axis 11 between the first and the second position.

Figure 10:
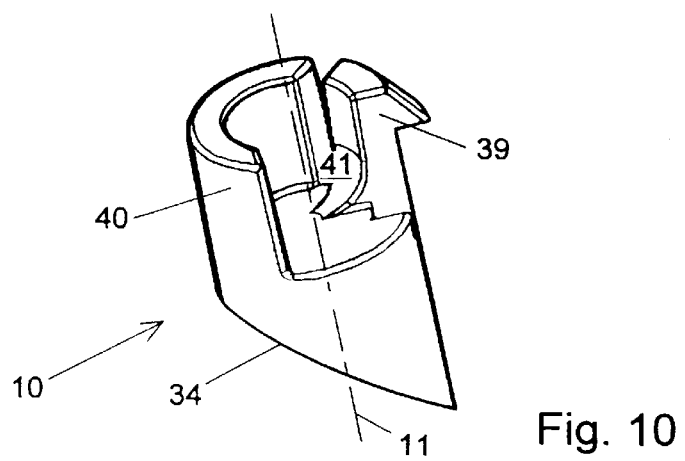
FIG. 10 is a schematic, perspective view of the retaining member of a module of FIG. 8.

Referring to FIG. 10, the closing part of the retaining member 10 is visible therein, designed as a raised edge 40. Located next to the raised edge 40 is a recess 41.

The operation of the retaining member 10 is as follows. By passing a screwdriver 37 into the groove 17 in the end face 34 of the retaining member 10, the retaining member 10 can be rotated relative to the rotation axis 11 over an angle of 90° anti-clockwise from the first position in which the raised edge 40 is located within the opening formed by the hinge loop 15, into a second position in which the raised edge 40 is located within the recess 9 and the recess 41 corresponds with the cavity formed by the hinge hole 15. Accordingly, a pin passed through the hinge loops 4 is retained in the first position and released in the second position.

By causing the bevel of the end face 34 to correspond with the angle of intersection between the rotation axis 11 and the center line through the hinge loops 4, it is provided that the end face 34 in the first position is substantially flush with the lateral side 7 of the module 1, but in the second position it extends outwards relative to the lateral side of the module 1. This has the advantage that the position of the closing part can readily be detected. Further, due to the bevel of the end face 34, the retaining of the hinge pin 33, i.e. moving the closing part from the second position into the first position, can be automated in a simple manner.

It is observed that in this embodiment, too, the retaining member can be designed in very many different manners, for instance as a cylindrical member having two end faces whose bevel extends in parallel. In this case, the retaining member 10 is adjusted between the first position and the second position by rotating it over 180° relative to the rotation axis 11. It is further observed that the blocking member and the guide means cooperating therewith can also be designed in very many different manners, for instance as a projection which extends radially outwards relative to the rotation axis of the retaining member and which cooperates with a cavity provided in the wall of the recess.

It is further observed that 'conveyor mat' should also be understood to include a conveyor chain which, transversely to the conveying direction, is built up of only one module. With such a conveyor mat, each module may have both its lateral sides provided with a retaining member and the dimensions of the modules transversely to the conveying direction may vary from very small to very great, depending on the type of conveyor mat.

What is claimed is:

1. A module for a modular conveyor mat for use in a conveyor operable to move in a specified conveying direction and comprising a plurality of modules, said module comprising:

a front part provided with front part hinge loops for accommodating a front hinge pin;

a rear part provided with rear part hinge loops for accommodating a rear hinge pin;

a top side;

a bottom side disposed opposite said top side;

first and second lateral sides extending between said front side and said rear side;

at least one recess in one of said lateral sides;

a retaining member disposed in said recess;

said retaining member rotatable about an axis of rotation extending through said retaining member and having a closing part rotatable between a first position for retaining a hinge pin received by said hinge loops in a direction extending transversely to said conveying direction and a second position for releasing a hinge pin received by said hinge loops; and said retaining member disposed within a boundary area formed by said top side and said bottom side of said module when said closing part is in said first position and when said closing part is in said second position.

2. A module in accordance with claim 1 wherein said retaining member has an outermost part and wherein said outermost part is disposed in a position substantially flush with a lateral side of said module.

3. The module in accordance with claim 1 wherein said recess comprises a side wall and said retaining member comprises a blocking member and a guide disposed in said side wall of said recess and wherein said blocking member cooperates with said guide to impede axial movement of said retaining member along said axis of rotation.

4. The module in accordance with claim 3 wherein said blocking member comprises a projection extending in a direction extending radially outward from said axis of rotation of said retaining member.

5. The module in accordance with claim 4 wherein said guide comprises a guideway extending over a path coinciding with a circular arc having an axis of rotation coincident with said access of rotation of said retaining member, said guideway comprising sidewalls arranged to guide said projection such that said guideway limits rotation of said closing part of said retaining member between said first and said second positions.

6. The module in accordance with claim 5 wherein said axis of rotation of said retaining member extends in a longitudinal direction and said projection comprises sidewalls extending resiliently outward relative to each other in a V-shaped configuration and in said longitudinal direction.

7. The module in accordance with claim 6 wherein said module has a lateral side and an opening in said lateral side for providing access to said guideway.

8. The module in accordance with claim 7 wherein said module comprises a bottom side provided with an opening for providing access to said projection.

9. The module in accordance with claim 1 wherein said axis of rotation intersects a centerline extending through said hinge loops of at least one of said front side and said rear side of said module at an angle falling in a range of angles between 10° and 80°.

10. The module in accordance with claim 9 wherein said retaining member has a cylindrical shape.

11. The module in accordance with claim 10 wherein said retaining member comprises an end face forming an outermost part and wherein said end face is beveled.

12. The module in accordance with claim 1 wherein said axis of rotation intersects a centerline extending through said hinge loops of at least one of said front side and said rear side of said module at an angle falling in a range of angles between 15° and 75°.

13. The module in accordance with claim 1 wherein said retaining member has an outer part extending outwardly relative to said lateral sides of said module for accommodating said retaining member.

14. A module for a modular conveyor mat for use in a conveyor operable to move in a specified conveying direction and comprising a plurality of modules, said module comprising:

a front part provided with front part hinge loops for accommodating a front hinge pin;

a rear part provided with rear part hinge loops for accommodating a rear hinge pin;

a top side;

a bottom side disposed opposite said top side;

first and second lateral sides extending between said front side and said rear side;

a recess in one of said lateral sides for retaining said retaining member;

a retaining member disposed in said recess and rotatable relative to an axis of rotation extending through said retaining member, said retaining member having a closing part rotatable between a first position for retaining a hinge pin received by said hinge loops and a second position for releasing a hinge pin received by said loops;

said closing part comprising a cylindrical element extending coaxially with said axis of rotation;

said cylindrical element having a circumferential edge and a nick extending in a direction parallel to said axis of rotation, such that in said first position of said closing part a hinge pin received by said loops is retained in a direction extending transversely to the conveying direction by said cylindrical element and in said second position of said closing part, a hinge pin received by said hinge loops is releasable in a direction transverse to said conveying direction.

15. The module in accordance with claim 14 wherein said recess comprises a recess wall and/or in said cylindrical element and said recessed wall each comprise a raised edge and a groove cooperating with said recess to provide resistance to rotation of said cylinder element from said first position.

16. The module in accordance with claim 14 wherein said retaining member comprises a bore extending over at least a portion of said axis of rotation and wherein said recess comprises a wall and a pin extending from said wall and into said bore, and wherein said bore cooperates with said pin.

* * * * *